T. H. JACOB.
SHOP DOLLY.
APPLICATION FILED JULY 26, 1919.

1,370,112.

Patented Mar. 1, 1921.

Inventor:
Thomas H. Jacob

UNITED STATES PATENT OFFICE.

THOMAS H. JACOB, OF WAUSAU, WISCONSIN.

SHOP-DOLLY.

1,370,112.  Specification of Letters Patent.  Patented Mar. 1, 1921.

Application filed July 26, 1919. Serial No. 313,574.

*To all whom it may concern:*

Be it known that I, THOMAS H. JACOB, a citizen of the United States, and resident of Wausau, in the county of Marathon and State of Wisconsin, have invented certain new and useful Improvements in Shop-Dollies; and I do hereby declare that the following is a full, clear, and exact description thereof.

My invention relates to new and useful improvements in that type of small compact trucks adapted for supporting heavy weights in a shop, and commonly designated by the term dolly, and particularly adapted for use in garages to support the end portion of an automobile whereby it may be readily moved in any direction.

It is in general the object of my invention to simplify and otherwise improve the construction of devices of this character, and to increase the convenience of manipulation of such devices.

It is more particularly my object to provide a simple jack lever mechanism associated with the dolly to raise the end of an automobile or other object as the dolly is inserted thereunder.

A further object is to increase the compactness of devices of this character, particularly when not in active use, so as to occupy a minimum amount of floor space.

A still further object resides in the provision of a device of this character which may be constructed chiefly of stock metal cut and bent in suitable shape, and which has its parts so arranged as to procure a proper distribution of load stresses conducing to a maximum strength and durability of the device with a minimum expenditure of material.

With the above and other objects and advantages in view, which will be apparent as the description proceeds, my invention resides in the novel features of construction, combination and arrangement of parts which will be hereinafter more particularly described and defined by the appended claims.

Figure 1:
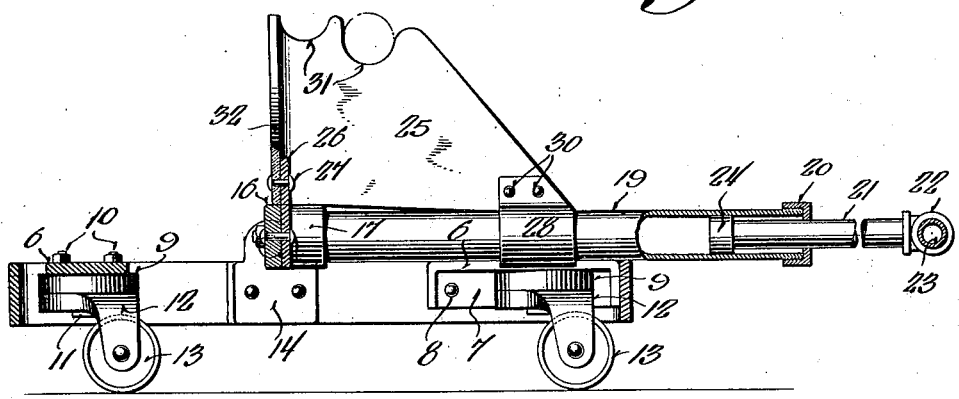
Figure 1 is a vertical sectional view through a shop dolly constructed in accordance with my invention, the plane of this section being indicated by the line 1—1 of Fig. 2.
Figure 2:
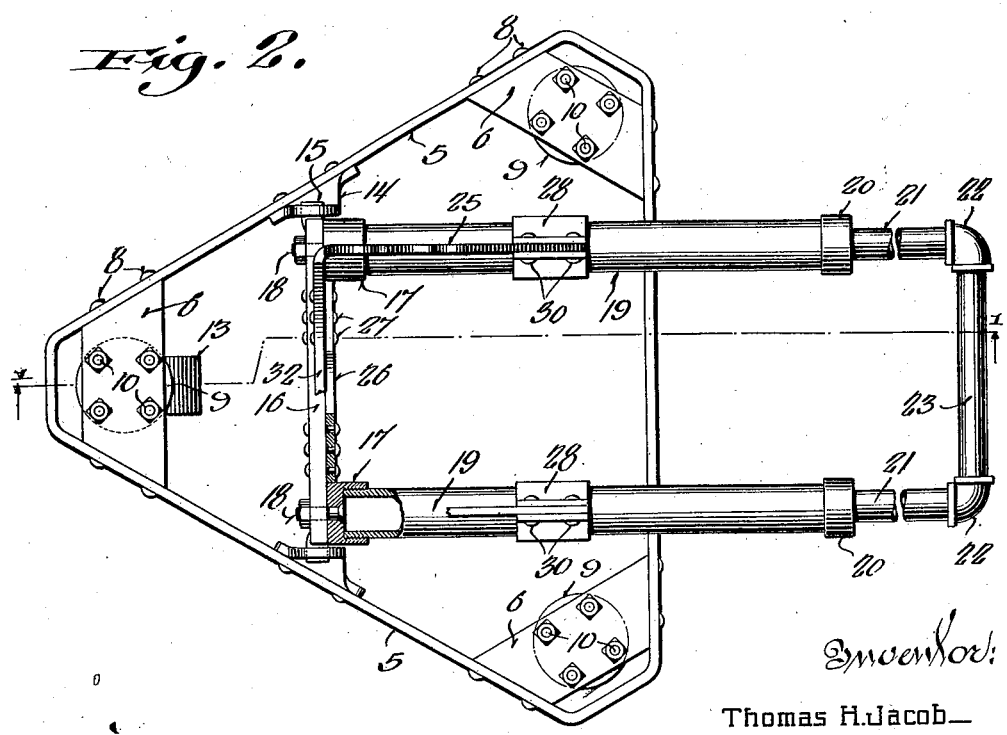
Fig. 2 is a plan view of the dolly.

Referring now more particularly to the accompanying drawings, the frame of the present embodiment of my invention comprises preferably a continuous length of heavy strap metal 5 disposed vertically on edge and bent in triangular shape, with blunt corners. An elongated brace plate 6 extends transversely across each corner portion of the frame and has its ends downturned at 7 for securement by rivets 8 to the frame sides, and a swivel block 9 is secured to the under face of each plate by bolts 10 passed through the plate and block. These blocks 9 carry depending pivot pins 11 passed through the bight portions of yokes 12 in which are mounted caster-wheels 13, a three-wheeled swiveled support being thus afforded for the frame, and these wheels or caster units may be provided with any suitable anti-friction means.

A pair of lug plates 14 are secured centrally to the sides of the frame, said plates having their upper portions extended above the frame and twisted to dispose their upper portions in parallel relation for the reception of pivot pintles 15 on the ends of a head bar 16 extending across the frame. A pair of cup-shaped members 17 are secured to the end portions of this bar at its face adjacent the free side of the frame by bolts 18 passed through the bar and the closed ends of said members, and inner tubular handle sections 19 have their inner ends threaded in these cup-shaped members, the outer ends of the handle sections extending outwardly of the frame and having caps 20 threaded on their outer ends which slidably receive a pair of outer handle sections 21, also tubular in the present instance, the outer ends of said outer handle sections 21 being connected by elbows 22 with a transverse section 23. The inner ends of the handle sections 21 are provided with enlargements 24 preventing their displacement from the inner sections 19. An extensible handle structure is thus provided which is exceedingly compact when not in active use, and which may be extended when desired to procure a maximum leverage. A U-shaped plate of heavy sheet metal 25 has its bight portion seated on the head bar 16 and is secured thereto by a connecting plate 26, fastening members 27 being passed through said connecting plate and the plate 25 and through the connecting plate and head bar. The end portions of the plate 25 extend over the handle sections 19 and are terminally secured thereto by straps 28 bent sleevelike about the sections 19, both ends of each strap being secured by rivets 30 to an end of the plate 25. The upper edges of the bent end portions of the plate 25 are recessed to provide concaved seats 31 for engagement with the axles of automobiles or with other articles to be lifted and transported by the dolly, and the recesses of each plate end portion differ in depth for engagement with different automobile axles. As shown in Fig. 1, the inner handle sections 19 are adapted to rest upon the free side of the dolly frame and thus a load seating in a pair of opposed recesses 21 of the plate 25 is distributed to all three sides of the dolly frame by reason of the pivot connections of the other two sides of the frame, and the load is securely held against displacement by its disposition at one side of the pivot axis when the handle sections 19 rest on the dolly frame. The U-shaped plate 25 affords an exceedingly simple support structure, the bight portion of said plate effectively bracing the walls formed by its bent end portions, and it is noted that the upper portion of the bight of the plate may be cut away at 32 without detracting from the strength of the structure. The plate 25, handle sections and head bar thus form a pivoted frame which may be inserted under an article to be lifted and supported by the dolly and then rocked on the dolly to move the dolly under the object and simultaneously lift the object from the ground, the object being maintained in lifted position by seating engagement of the pivoted frame on the dolly frame.

I have thus provided an efficient and readily manipulated dolly and jack structure which may be economically formed of stock metal and wherein the various parts are mutually braced to procure adequate strength and rigidity with a minimum expenditure of material, attention being directed to the fact that the plates which are utilized to secure the casters or wheels 13 to the dolly frame form efficient corner braces for said frame.

While I have shown and described a preferred embodiment of my invention, it will be appreciated that various changes and modifications of structure may be employed to meet differing conditions of use and manufacture without departing in any manner from the spirit of my invention.

What is claimed is:

1. A device of the class described comprising a main wheeled frame, a head bar pivoted on the main frame, cup-shaped connecting members, bolts passed through the ends of said cup-shaped connecting members and the head bar, handle sections having their inner ends threaded in said cup-shaped connecting members, and a seat supported by said head bar and handle sections.

2. A device of the class described comprising a main wheeled frame, a head bar pivoted on the main frame, members extending from said head bar, and a plate bent in U-shape, with its bight disposed on said head bar and its legs disposed on and secured to said extensions, the upper edges of the legs of said plate being recessed to provide work seats.

3. A device of the class described comprising a main wheeled frame, a head bar pivoted on the main frame, members extending from said head bar, and a plate bent in U-shape, with its bight disposed on said head bar and its legs disposed on said extensions, a strap bent around each extension, and fastening members passed through the ends of the strap and a corresponding leg of the plate.

In testimony that I claim the foregoing I have hereunto set my hand at Wausau, in the county of Marathon and State of Wisconsin.

THOMAS H. JACOB.